(12) United States Patent
Kim et al.

(10) Patent No.: US 8,559,360 B2
(45) Date of Patent: Oct. 15, 2013

(54) METHOD AND APPARATUS FOR CONTROLLING POWER FOR UPLINK

(75) Inventors: Hyun-Jae Kim, Incheon (KR); Sung Cheol Chang, Daejeon (KR); Sung Kyung Kim, Daejeon (KR); Won-Ik Kim, Daejeon (KR); Chul Sik Yoon, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 363 days.

(21) Appl. No.: 12/965,157

(22) Filed: Dec. 10, 2010

(65) Prior Publication Data

US 2011/0141933 A1 Jun. 16, 2011

(30) Foreign Application Priority Data

Dec. 11, 2009 (KR) .................. 10-2009-0123299
Nov. 23, 2010 (KR) .................. 10-2010-0117011

(51) Int. Cl.
*H04B 7/185* (2006.01)
*H04B 7/00* (2006.01)

(52) U.S. Cl.
USPC .......................................... 370/318; 455/524

(58) Field of Classification Search
USPC ......... 370/318, 319, 328, 329, 330, 331, 333;
455/446, 447, 450, 451, 452, 436,
455/13.4, 524, 525, 68, 69, 133–135
See application file for complete search history.

(56) References Cited

U.S. PATENT DOCUMENTS

| 8,285,319 | B2* | 10/2012 | Shin et al. ................ 455/522 |
| 2009/0280822 | A1* | 11/2009 | Ericson et al. .......... 455/452.2 |
| 2010/0208687 | A1* | 8/2010 | Lim et al. ................ 370/329 |
| 2011/0117953 | A1* | 5/2011 | Kim et al. ................ 455/522 |

* cited by examiner

*Primary Examiner* — Hanh N Nguyen
(74) *Attorney, Agent, or Firm* — Jefferson IP Law, LLP

(57) ABSTRACT

A method and apparatus for controlling power for uplink are provided. When a base station is moving or unable to communicate with others, at least one interference amount is estimated for a neighboring base station based on a path gain between a terminal and the neighboring base station and a transmission power of each encoding packet size and transmission format included in a candidate group related to scheduling transmission power parameters. A target interference amount is determined based on an interference amount control value and an initial target interference amount according to a processing load of a serving base station, and one interference amount is selected from estimated interference amounts based on the target interference amount. The terminal determines the transmission power based on an encoding packet size and a transmission format corresponding to the selected interference amount.

19 Claims, 10 Drawing Sheets

METHOD AND APPARATUS FOR CONTROLLING POWER FOR UPLINK

PRIORITY

This application claims the benefit under 35 U.S.C. §119(a) of a Korean patent application filed in the Korean Intellectual Property Office on Dec. 11, 2009, and assigned Serial No. 10-2009-0123299, and of a Korean patent application filed on Nov. 23, 2010 in the Korean Intellectual Property Office and assigned Serial No. 10-2010-0117011, the entire disclosures of both of which are hereby incorporated by reference.

BACKGROUND OF THE INVENTION

1. Field of the Invention

The present invention relates to controlling an interference amount. More particularly, the present invention relates to a method for controlling uplink transmission power of a wireless communication system, and an apparatus thereof.

2. Description of the Related Art

In a wireless communication system such as a Wireless BROadband (WIBRO) system, data transmission performance deteriorates at a terminal of a serving base station due to interference caused by uplink data from a terminal of a neighboring base station. Particularly, such a problem becomes worse at a terminal located at a cell edge area.

In the case of open-loop power control, a base station broadcasts a Noise and Interference (NI) value measured from a neighboring cell and a terminal increases power for a transmission signal to compensate for the interference amount from the neighboring base station based on the received NI value. Due to such power control, the intensity of a transmission signal of a terminal becomes too strong.

It further degrades the data transmission performance of terminals located at a corresponding base station. In order to overcome such a problem, a Fractional Frequency Reuse (FFR) scheme has been used. In the FFR scheme, a frequency bandwidth is divided for an edge terminal and a central terminal located in a cell of a serving base station. Then, power is controlled by reusing a frequency bandwidth allocated to an edge terminal of a neighboring base station for the central terminal of the serving base station.

Through the above-described power control, the interference to the neighboring cell is reduced. In order to effectively control the interference, the serving base station and the neighboring base station exchange necessary information for the power control through communication.

Further, the serving base station and the neighboring base station transmit the necessary information for the power control to each terminal in order to reduce the power of uplink data that influences terminals located at a service area of the neighboring base station. However, a base station cannot exchange information with a plurality of other base stations when the base station does not establish a communication channel to neighboring base stations because the base station is moving.

Accordingly, it is necessary to minimize interference influencing a service area of a neighboring base station by estimating an interference amount influencing a neighboring cell using a measurement of a signal transmitted from a neighboring base station, and controlling the uplink power for a terminal located at a central area of a corresponding base station based only on the estimated interference.

The above information disclosed in this Background section is only for enhancement of understanding of the background of the invention, and therefore it may contain information that does not form the prior art that is already known in this country to a person of ordinary skill in the art.

SUMMARY OF THE INVENTION

An aspect of the present invention is to address at least the above-mentioned problems and/or disadvantages and to provide at least the advantages described below. Accordingly, an aspect of the present invention is to provide a method for controlling uplink power of a wireless communication system and an apparatus thereof having advantages of effectively reducing an interference amount to a neighboring cell in a wireless communication system.

Another aspect of the present invention is to provide a method for controlling an uplink power of a wireless communication system and an apparatus thereof for effectively reducing an interference amount to a neighboring cell when a base station is unable to communicate with a plurality of neighboring base stations in a wireless communication system.

In accordance with an aspect of the present invention, a method for controlling an uplink power of a terminal at a base station is provided. The method includes obtaining, by a base station, a candidate group including schedulable encoding packet sizes and transmission formats each having different transmission power per tone, calculating a path gain between the terminal and a neighboring base station, estimating at least one interference amount for a neighboring base station based on the calculated path gain and the transmission power per tone of each encoding packet size and transmission format included in the candidate group, determining a target interference amount based on an interference control amount, selecting one from the at least one estimated interference amount based on the target interference amount, and controlling the transmission power of the terminal based on the encoding packet size and transmission format corresponding to the selected estimated interference amount.

In accordance with another aspect of the present invention, an apparatus for controlling uplink power of a terminal at a base station is provided. The apparatus includes, a candidate group obtaining unit for obtaining a candidate group having schedulable encoding packet sizes and transmission formats each having a different transmission power per tone, a path gain calculation unit for calculating a path gain between the terminal and a neighboring base station, an interference amount estimation unit for estimating at least one interference amount for the neighboring base station based on the calculated path gain and the transmission power per tone of each encoding packet size and transmission format included in the candidate group, a target interference amount setup unit for setting up a target interference amount based on an initial target interference amount according to a processing load of a base station and an interference amount control value, and a transmission power parameter setup unit for selecting a transmission power parameter based on the target interference amount from the estimated interference amounts, obtaining an encoding packet size and a transmission format corresponding to the selected interference amount, and providing the obtained encoding packet size and transmission format to the terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art would recognize that various changes and modifications of the embodiments described herein can be made without departing from the spirit or scope of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, unless explicitly described to the contrary, the word "comprise" and variations such as "comprises" or "comprising" will be understood to imply the inclusion of stated elements but not the exclusion of any other elements.

In the specification, a User Terminal (UT) may designate a Mobile Station (MS), a terminal (terminal), a Mobile Terminal (MT), a Subscriber Station (SS), a Portable Subscriber Station (PSS), User Equipment (UE), and an Access Terminal (AT). Further, the terminal may include the entire function or partial function of the mobile terminal, the subscriber station, the portable subscriber station, and the user equipment.

In the specification, a Base Station (BS) may designate an access router, an Access Point (AP), a Radio Access Station (RAS), a node B, a Base Transceiver Station (BTS), and a Mobile Multihop Relay (MMR)-BS. Further, the base station may entirely or partially include functions of an access point, a radio access station, a node B, a base transceiver station, and a MMR-BS.

Hereinafter, a method for controlling uplink power and an apparatus thereof according to an exemplary embodiment of the present invention will be described with reference to the accompanying drawings.

Figure 1:
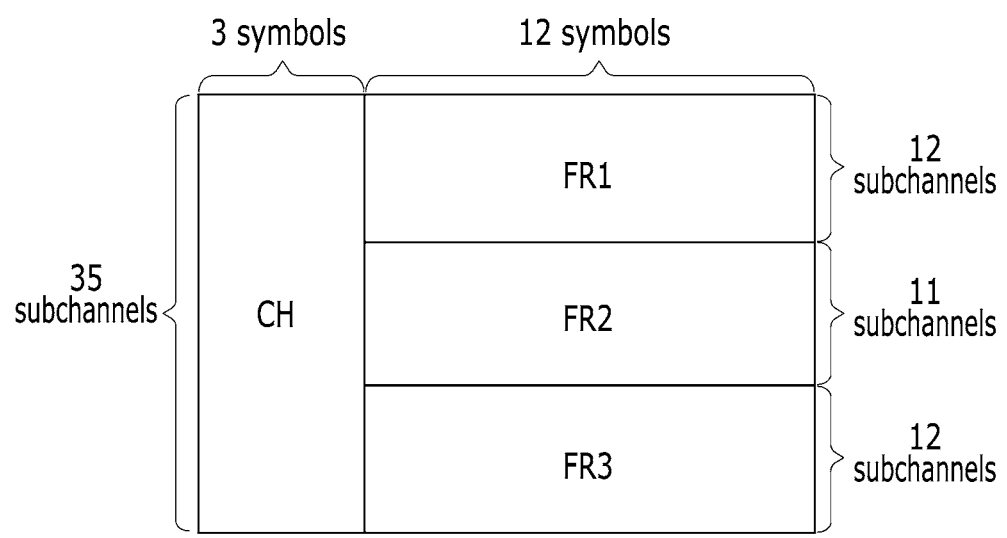
FIG. 1 is a diagram illustrating a structure of an uplink frame according to an exemplary embodiment of the present invention.

FIG. 1 is a diagram illustrating a structure of an uplink frame according to an exemplary embodiment of the present invention.

Referring to FIG. 1, the UpLink (UL) Frame (ULF) according to an exemplary embodiment of the present invention includes a plurality of Fractional Frequency Reuse (FFR) regions FR1-FR3 and a control CHannel region (CH). In more detail, when an uplink frame includes a plurality of symbols (e.g., 15 symbols), a predetermined number of symbols (e.g., 3 symbols) may be assigned to a control channel region, and remaining symbols (e.g., 12 symbols) may be divided among a plurality of FFR regions (e.g., 3 FFR regions) and assigned to each FFR region (e.g., 3 symbols). For convenience, a fractional frequency reuse region is referred to herein as an "FFR region".

The control channel region is a region for transmitting control symbols controlling transmission of frame synchronization or channel quality information. The FFR regions (FR1-FR3) are regions for transmitting data symbols.

In a Partial Usage of SubChannels (PUSC) where uplink resources are allocated according to a subchannel allocation scheme, 35 subchannels may be used. In this case, the FFR regions FR1 and FR3 may be respectively formed of 12 subchannels, and the FFR region FR3 may be formed of 11 subchannels.

The FFR scheme is not applied to an existing wireless communication system. Accordingly, a terminal uses a closed-loop power control scheme and an open-loop power control scheme with a subchannel allocation method using an interference averaging characteristic. In this case, an interference amount may be further increased because the terminal increases the transmission signal power to compensate for an amount of interference from a neighboring cell according to a measured Noise and Interference (NI) value from the neighboring cell.

Although unlikely, uplink resources may be allocated using the FFR scheme, and the transmission power of a terminal transmitting data based on the allocated uplink resources may be controlled in accordance with an exemplary embodiment of the present invention.

Figure 2:
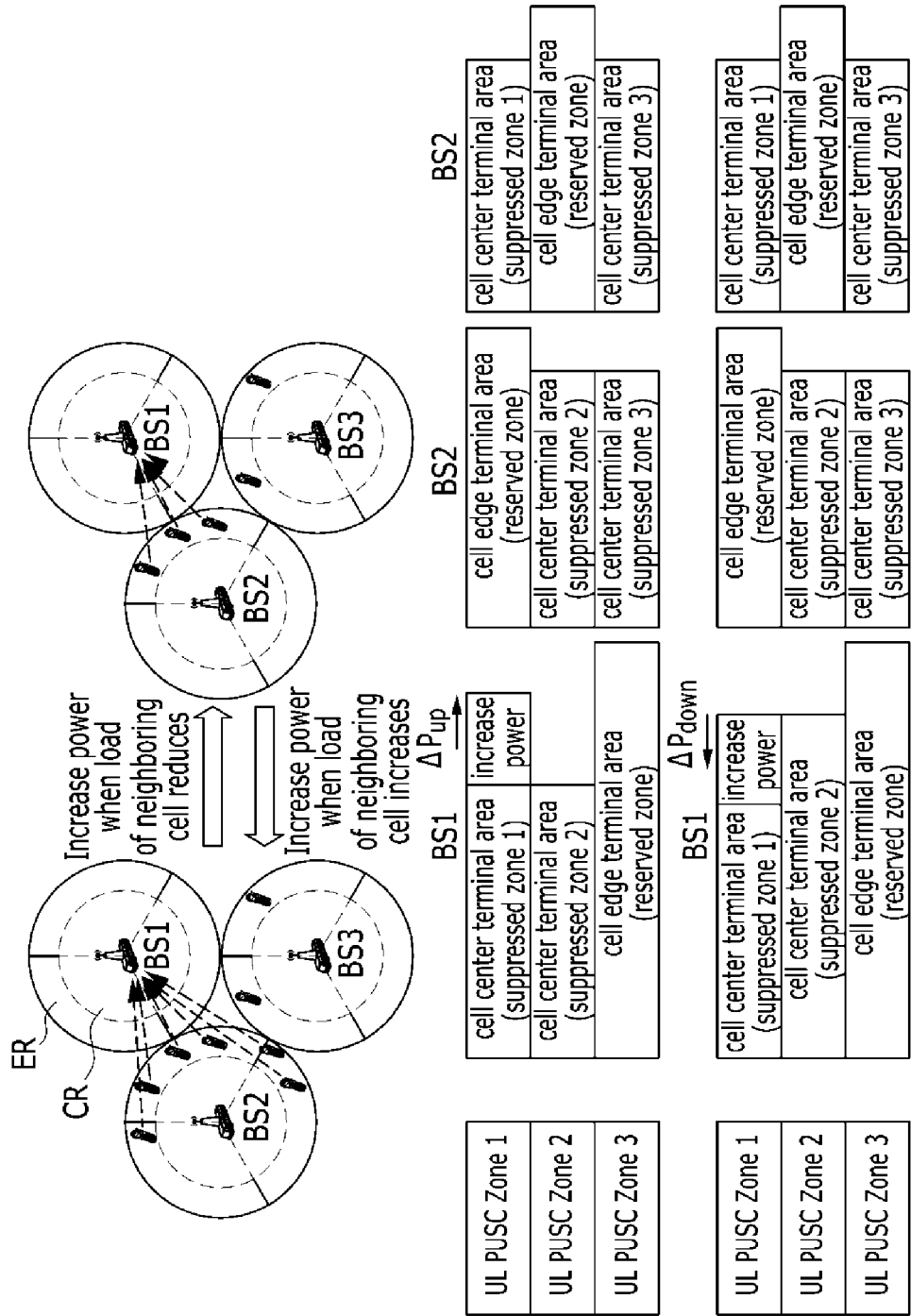
FIG. 2 is a diagram illustrating a wireless communication environment according to an exemplary embodiment of the present invention.

FIG. 2 is a diagram illustrating a wireless communication environment according to an exemplary embodiment of the present invention.

Referring to FIG. 2, each base station BS1-BS3 uses the same radio resources, and communicates with terminals located in a corresponding cell in the wireless communication environment, including a plurality of adjacent base stations BS1-BS3. Each cell is divided into a Center Region (CR) and an Edge Region (ER). Terminals are classified into a center terminal and an edge terminal according to a corresponding region of the cell in which the terminal is located. A terminal located at the center region may be referred as a "cell center terminal," and a terminal located at the edge region may be referred as a "cell edge terminal."

In order to determine whether a terminal is a cell center terminal or a cell edge terminal, a Carrier to Interference plus Noise Ratio (CINR) for a preamble signal may be used. That is, a base station may transmit a preamble signal to each terminal in a corresponding cell. Each terminal receives the preamble signal, measures the CINR, and reports the measured CINR value back to the base station. The base station compares the CINR provided from each terminal with a predetermined threshold. If the CINR value of a terminal is greater than the predetermined threshold, the base station determines that the corresponding terminal is a cell center terminal. If the CINR value of the terminal is smaller than the predetermined threshold, the base station determines that the corresponding terminal is a cell edge terminal. However, a method for determining whether a terminal is a cell center terminal or a cell edge terminal is not limited to the above-described method.

In such a wireless communication environment, a base station forming one sector may divide controllable uplink resources into a reserved zone and a suppressed zone when uplink power is controlled based on an FFR scheme, according to an exemplary embodiment of the present invention. In the reserved zone, a terminal may transmit data to a base station with maximum transmission power. In the suppressed zone, a terminal may transmit data to a base station in response to power control of the base station. The cell center terminal may be allocated with resources of the suppressed zone, and the cell edge terminal may be allocated with resources of the reserved zone. However, it is not limited thereto.

As shown in FIG. 2, each base station may be classified as controllable uplink resources UL PUSC zone 1-UL PUSC zone 3. For example, a base station BS1 may use one uplink resource UL PUSC zone 3 as a reserved zone and use the other uplink resources UL PUSC zone 1 and UL PUSC zone 2 as a suppressed zone. A base station (e.g., BS1) may use an uplink resource (e.g., UL PUSC zone 1) as a suppressed zone and allocate the same uplink resource to a cell center terminal. Further, another base station (e.g., BS2) may use a corresponding uplink resource (e.g., UL PUSC zone 1) as a reserved zone and allocate the same uplink resource to a cell edge terminal.

In the wireless communication environment according to an exemplary embodiment of the present invention, each base station can provide service to a cell edge terminal located at an edge of a cell through a reserved zone without interference from an adjacent cell. Further, a corresponding terminal minimizes interference influencing an adjacent cell when data is transmitted through a suppressed zone. Accordingly, transmission power of a terminal corresponding to a suppressed zone is controlled through uplink power control.

A base station estimates an interference amount of a neighboring cell based on a signal from a cell edge terminal of a neighboring base station in order to control transmission power of a predetermined uplink resource set as a suppressed zone. The interference amount of a neighboring cell is based on Interference over Thermal (IoT). IoT may be defined by an equation that divides a sum of an interference signal value and a thermal noise power by a thermal noise power in an entire Orthogonal Frequency Division Modulation (OFDM) subcarrier. IoT may be expressed as Equation 1 below.

$$IoT = \frac{\sum_{n=0}^{N} I_n + \sigma^2}{\sigma^2} \approx \frac{\sum_{n=0}^{N-1} |r[n] - s[n]|^2}{\sigma^2} \qquad \text{[Equation 1]}$$

In Equation 1, $\sigma^2$ denotes thermal noise power, $I_n$ indicates an interference signal value, $r[n]$ is a received signal, and $s[n]$ is an estimated signal. Further, n is a positive integer.

When a load of a neighboring cell is reduced, IoT is reduced as well. In this case, a base station (e.g., BS1) increases transmission power of a suppressed zone (e.g., UL PUSC zone 1). On the contrary, when a load of a neighboring cell is increased, IoT is increased as well. In this case, the base station BS1 reduces transmission power of a suppressed zone (UL PUSC zone 1). Here, the load of the neighboring cell may be defined as a total interference amount that influences a neighboring cell.

However, it is difficult to detect a load of a terminal in a neighboring cell when a base station is moving or when the base station is unable to communicate with a neighboring base station. In this case, the base station measures an interference amount based on uplink data transmitted from a cell edge terminal in a neighboring cell, and estimates the load of the neighboring cell based on the measured interference amount. In an exemplary embodiment of the present invention, uplink power control is performed based on the following two cases in order to further accurately estimate an interference amount and perform power control for uplink data transmission when a base station is moving or when the base station is unable to communicate with a neighboring base station.

1) A preamble transmission power of a neighboring cell is fixed (first case).

2) A preamble transmission power of a neighboring cell is changed (second case).

First, a method of controlling uplink power according to an exemplary embodiment of the present invention that controls uplink power in consideration of the first case will be described.

It is assumed that a preamble transmission power of a serving base station and of neighboring base stations is the same in this exemplary embodiment of the present invention. In this exemplary embodiment of the present invention, an interference amount of a neighboring cell is estimated based on a path gain between a terminal and a neighboring base station, a target interference amount is controlled based on the estimated interference amount and an offset value selected according to a load state of a serving base station, and an uplink transmission power is controlled according to the controlled target interference amount.

First, an interference amount according to each variable will be described.

A serving base station sets uplink resources allocated to a cell center terminal as a suppressed zone because the cell center terminal needs to minimize an interference amount influencing a neighboring base station. Here, the cell center terminal may be selected by the service base station through scheduling as a user grouping method.

When a path gain between a terminal corresponding to the suppressed zone and a serving base station is greater than a predetermined threshold, the interference amount from the corresponding terminal to a neighboring base station is comparatively small. When the path gain is smaller than the predetermined threshold, the interference amount from the corresponding terminal to the neighboring base station is comparatively large. The path gain to a corresponding base station may be calculated based on a preamble signal transmitted from a neighboring base station. Based on the calculated path gain, it can be estimated how much power per tone transmitted from a terminal influences a neighboring base station in a unit of IoT.

A target IoT value is set up and a transmission power is determined to satisfy the target IoT value within a predetermined range. Here, the target IoT value is an IoT value influencing a neighboring base station. That is, a power range satisfying the target IoT is determined, and a transmission power per tone is determined within the determined power range.

The IoT values obtained by each base station are shared, and the shared IoT values may be additionally considered to perform power control. However, such information cannot be used in power control because a base station cannot receive information on an IoT value from neighboring base stations when the base station is On The Move (OTM) or when the base station is unable to communicate with neighboring base stations.

Accordingly, for further efficient power control, a schedulable encoding packet size and a transmission format are obtained and set up as a candidate group in an exemplary embodiment of the present invention. Here, the schedulable encoding packet size and the transmission format are those when an Outer Loop Power Control (OLPC) scheme is applied to a corresponding terminal in a current frame. Then, an interference amount that influences a neighboring cell is estimated based on an IoT value measured at each zone, and an optimal encoding packet size and an optimal transmission format are selected from service-available encoding packet sizes and transmission formats included in the candidate group. The optimal encoding packet size and transmission format denote those that can reduce the estimated interference amount.

In this case, when a measured IoT value is greater than a predetermined threshold, an encoding packet size and a transmission format that satisfy a comparatively low target IoT value are selected. When a measured IoT value is smaller than the predetermined threshold, an encoding packet size and a transmission format that satisfy a comparatively large target IoT value are selected so as to control transmission power to be increased regardless of the interference amount.

In an exemplary embodiment of the present invention, an initial value of a target IoT is set to appropriately control a target IoT value according to variation of IoT values measured by zones, and an optimal target IoT is determined by controlling the predetermined initial value based on an offset according to the variation of IoT values measured by zones. Hereinafter, for better comprehension and ease of description, the initial value of the target IoT is referred to as "initial target IoT," and an offset for controlling the initial target IoT is referred to as an "interference amount control value."

Figure 3:
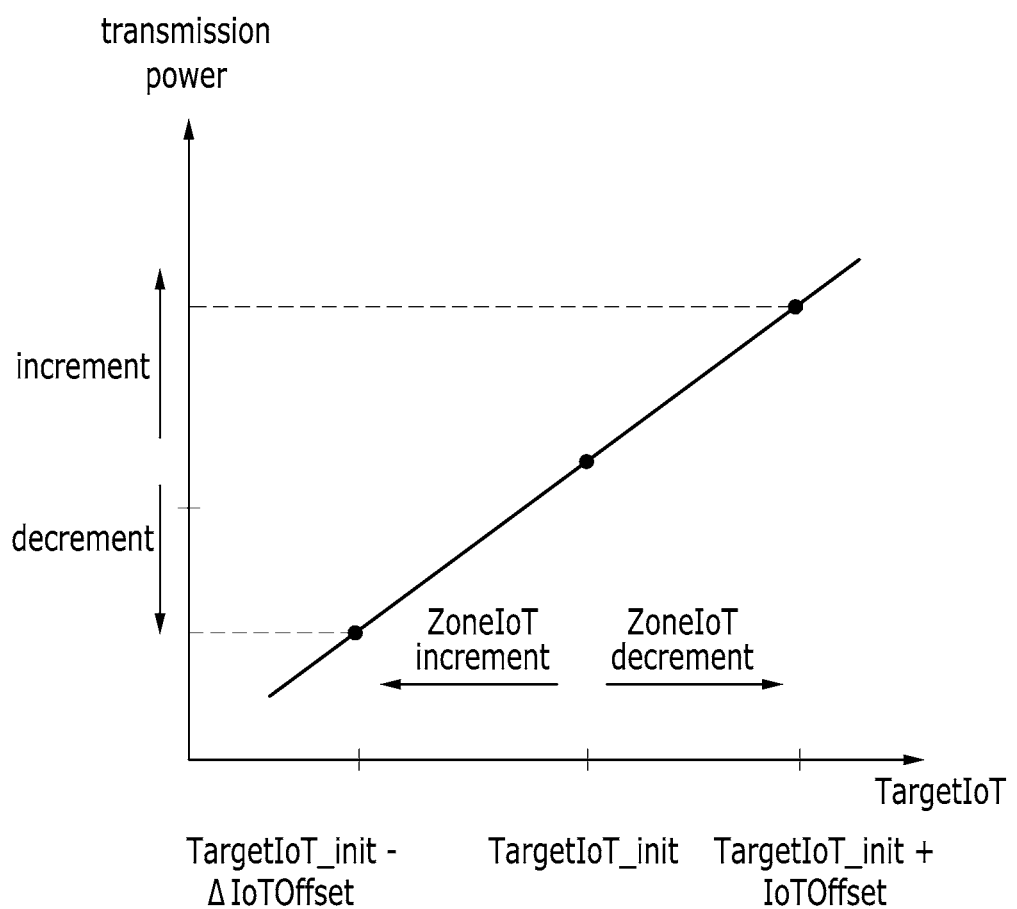
FIG. 3 is a graph illustrating a relation between a target Interference over Thermal (IoT) and uplink transmission power according to an exemplary embodiment of the present invention.

FIG. 3 is a graph illustrating a relation between a target IoT and an uplink transmission power according to an exemplary embodiment of the present invention.

Referring to FIG. 3, the transmission power per tone increases as a target IoT increases, and decreases as the target IoT decreases. When an IoT value decreases in a measured zone after determining the initial target IoT, a proper interference amount control value ($\Delta IoT_{offset}$) is set up and a higher target IoT is set up by adding the setup interference amount control value to the initial target IoT, in order to increase the transmission power per tone. In order to decrease the transmission power per tone when the measured IoT value increases, a proper interference amount control value ($\Delta IoT_{offset}$) is set up and a lower target IoT is set up by subtracting the set up interference amount control value from the initial target IoT, in order to increase transmission power per tone.

As described above, the interference amount control value ($\Delta IoT_{offset}$) is set up according to the variation of IoT values measured by zones and the optimal target IoT can be controlled based on the predetermined interference amount control value. Accordingly, it is required to properly set up an initial target IoT in order to determine an optimal target IoT.

Hereinafter, a method for determining an initial target IoT will be described.

In an exemplary embodiment of the present invention, the initial target IoT is determined based on a processing load of a serving base station.

In general, when the number of terminals in a cell of a base station increases, a load of a scheduler of the base station increases for allocating uplink resources. If an initial target IoT is fixed regardless of a processing load of a base station, an encoding packet size and a transmission format for low transmission power per tone may be selected due to a low target IoT value, although the number of terminals increases. Accordingly, more subchannels are required for uplink data transmission. In this case, performance of a cell edge terminal may be improved by reducing the influence of interference. However, when the number of terminals requiring subchannels is increased significantly, resources may not be allocated thereto. That is, a service outage probability increases and system performance deteriorates due to the increment of the service outage possibility.

Figure 4:
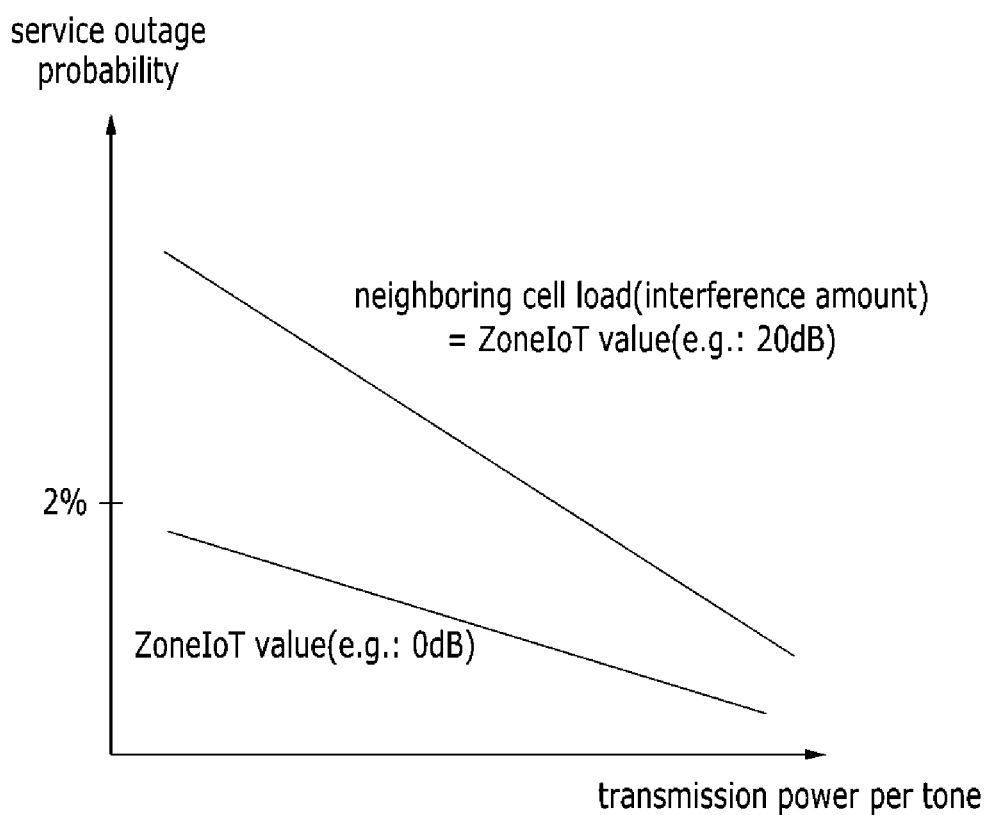
FIG. 4 is a graph showing a relation between transmission power per tone and a service outage probability according to an exemplary embodiment of the present invention.

FIG. 4 is a graph showing a relation between a transmission power per tone and a service outage probability according to an exemplary embodiment of the present invention.

Referring to FIG. 4, as the load of a neighboring cell (i.e., the measured IoT of each zone) increases, the transmission power per tone of a serving base station needs to be increased in order to constrain a service outage probability and overcome an interference amount. On the contrary, as the load of neighboring cell decreases, the transmission power per tone of the serving base station is reduced because the service outage probability can be constrained with a relatively small value.

Figure 5:
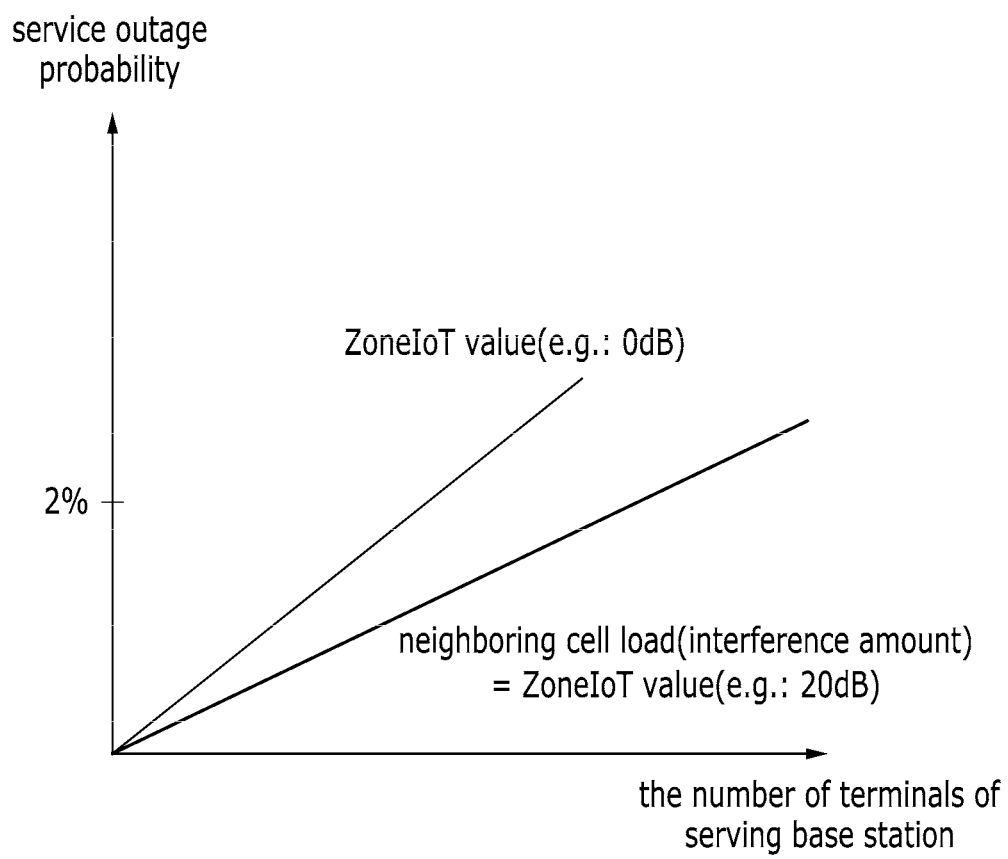
FIG. 5 is a graph illustrating a relation between a service outage probability and the number of terminals that a service base station can provide a service to according to an exemplary embodiment of the present invention.

FIG. 5 is a graph illustrating a relation between a service outage probability and the number of terminals that a service base station can provide service to, according to an exemplary embodiment of the present invention.

Referring to FIG. 5, the number of terminals that a serving base station can serve decreases as a load of a neighboring cell increases. In other words, the number of terminals that a serving base station can serve increases when the load of a neighboring cell is comparatively small (i.e., when an interference amount is small). On the other hand, the number of terminals that a service base station can serve decreases when the load of the neighboring cell is comparatively large (i.e., when an interference amount is large).

When the number of terminals that a serving base station can serve is greater than a predetermined threshold, the neighboring cell load is comparatively small based on the described characteristics of FIG. 4 and FIG. 5. Accordingly, an initial target IoT value is set up as a comparatively small value because the transmission power per tone of the serving base station can constrain a service outage probability with a small value. On the other hand, when the number of terminals that a serving base station can serve is smaller than the predetermined threshold, the neighboring cell load is comparatively large. Accordingly, an initial target IoT value is set up as a comparatively large value because the transmission power per tone of the serving base station needs to be increased to constrain a service outage probability and to overcome an interference amount. The transmission power per tone and the initial target IoT, according to a relation between the number of terminals that a serving base station can serve and the service outage probability, can be obtained through a plurality of simulations.

Figure 6:
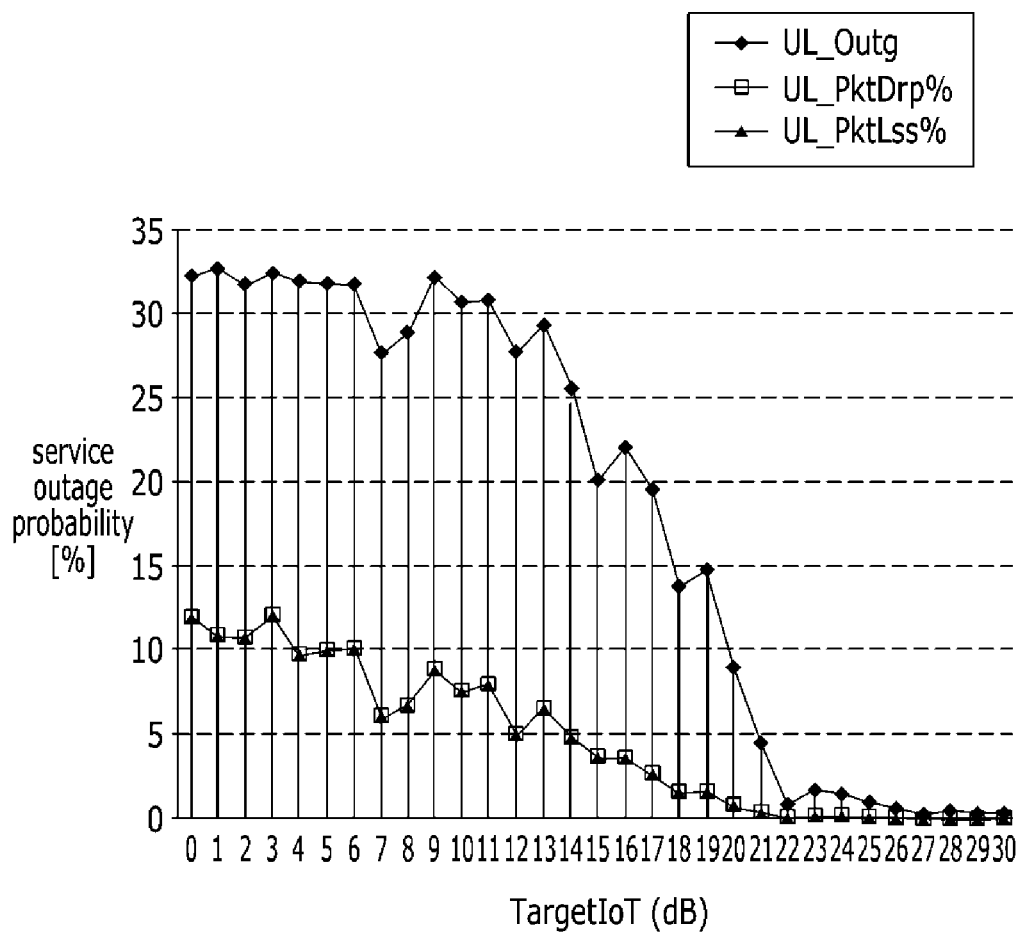
FIG. 6 is a graph illustrating a relation between a target IoT and a service outage probability according to an exemplary embodiment of the present invention.

FIG. 6 is a graph illustrating a relation between a target IoT and a service outage probability according to an exemplary embodiment of the present invention. More particularly, FIG. 6 is a diagram illustrating a service outage probability according to variation of a target IoT value with an assumption that the number of terminals that a base station provides service to within a corresponding cell is 120.

Referring to FIG. 6, the graph shows that the service outage probability is increased when the target IoT is comparatively low. Further, the graph shows that the service outage probability is decreased when the target IoT is comparatively high. When the target IoT is comparative low, the service outrage probability is increased because a transmission power per tone decreases for a cell center terminal, and the number of requested subchannels is increased. Accordingly, an initial target IoT may be selected within a predetermined range, e.g., from about 22 dB to about 30 dB as shown in FIG. 6, in order to constrain a target service outage probability (for example, to 2%).

An initial value of a target IoT is selected from the predetermined range based on IoT of each zone. Later, a target IoT value is controlled within a corresponding boundary according to variation of an IoT value of each zone. An encoding packet size and a transmission format are selected based on the controlled target IoT value.

A range of a target IoT may be determined based on the initial target IoT as a reference. That is, after an initial target IoT is determined according to a processing load of a serving base station, a range of a target IoT constraining a target service outage probability (e.g., to 2%) may be obtained by controlling the initial target IoT based on the interference amount control value according to the variation of IoT values measured by zone. This is for reducing transmission power based on an interference amount from a neighboring base station within a predetermined range constraining a target service outage probability. For convenience, the predetermined range for selectable target IoTs based on an initial target IoT is referred to herein as an "interference amount control range."

For example, an average IoT value for each frame and a controllable interference amount ($\Delta IoT_{offset}$) per tone is described based on the average IoT value. Further, an interference amount control range is obtained by applying the interference amount control value to the initial target IoT. Here, the interference amount control range is a target IoT range. For example, it may form a relation of initial target IoT−interference amount control value<initial target IoT<initial target IoT+predetermined range of interference amount control value.

Within the interference amount control range, an IoT value estimated for a terminal is determined as a target IoT value, an encoding packet size and a transmission format having a transmission power per tone is close to the determined target IoT, and uplink data transmission of a terminal is controlled based on the selected encoding packet size and transmission format.

Figure 7:
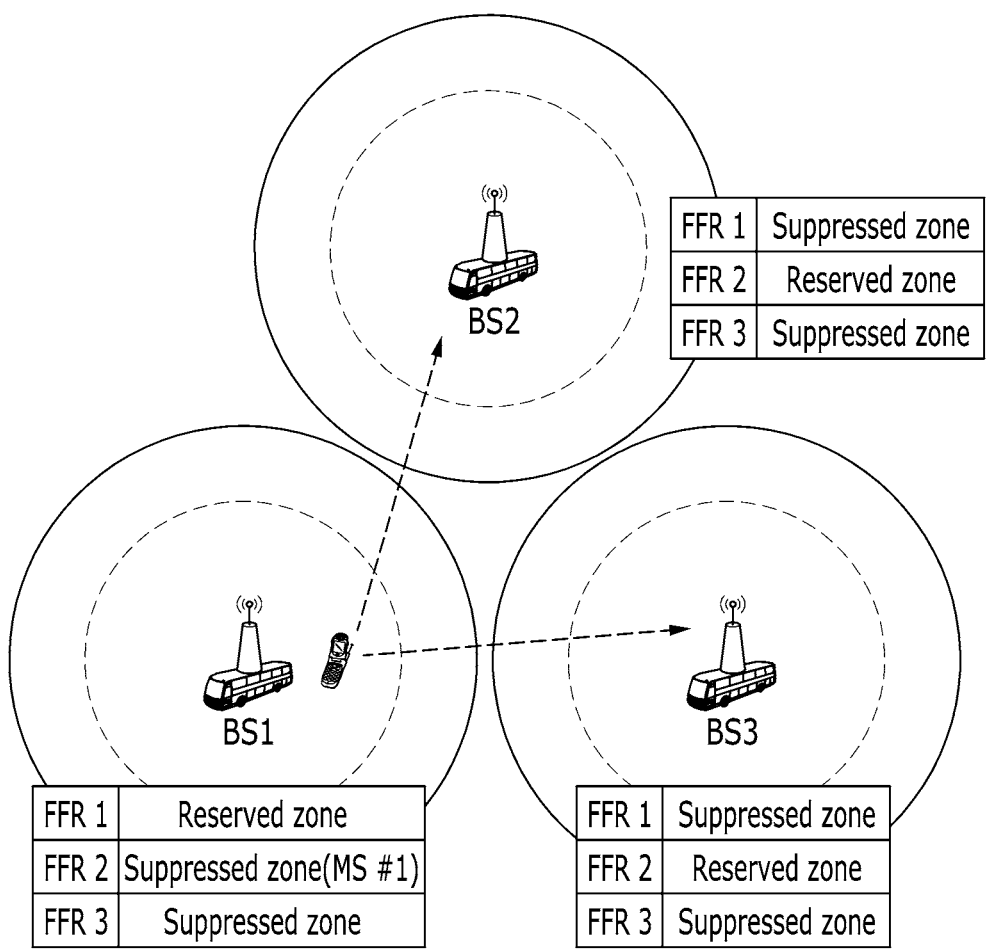
FIG. 7 is a diagram illustrating a wireless communication environment for uplink power control according to the first exemplary embodiment of the present invention.
Figure 8:
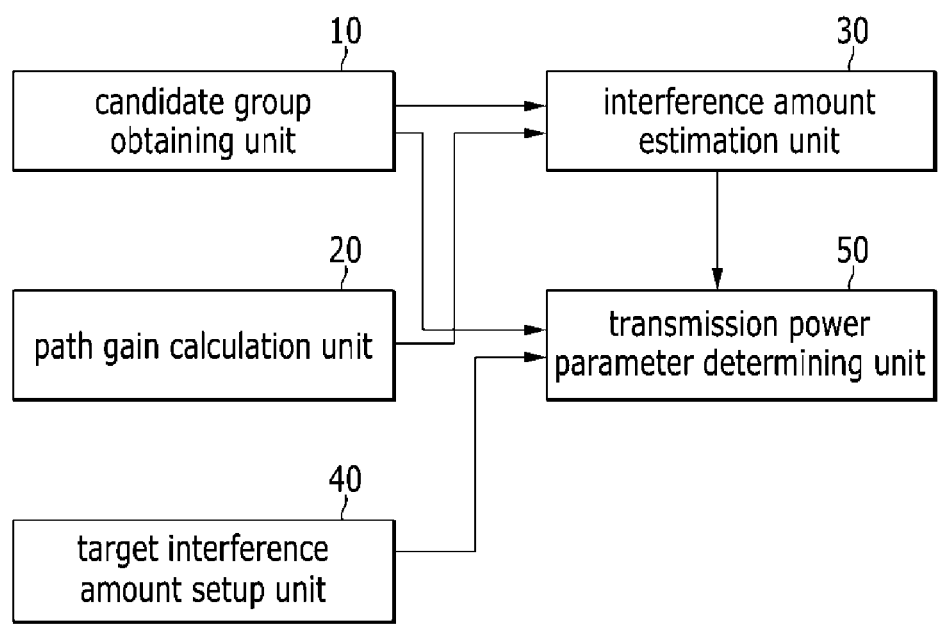
FIG. 8 is a diagram illustrating an apparatus for uplink power control according to an exemplary embodiment of the present invention.

FIG. 7 is a diagram illustrating a wireless communication environment for uplink power control according to an exemplary embodiment of the present invention. FIG. 8 is a diagram illustrating an apparatus for uplink power control according to an exemplary embodiment of the present invention.

In an exemplary embodiment of the present invention, base stations BS1-BS3 provide services to terminals located in a corresponding cell, and the uplink resources for transmitting data to each terminal are divided into a suppressed zone and a reserved zone to provide service as in the wireless communication environment of FIG. 2. In this case, the same uplink resource may be used as a suppressed zone by a base station and while also being used as a reserved zone by other base stations. Further, the same uplink resource may be identically used as a suppressed zone or a reserved zone by all base stations.

Since a terminal corresponding to the reserved zone can transmit data with a maximum transmission power, uplink power control is performed for terminals corresponding to a suppressed zone. When data is transmitted with an encoding packet size and a transmission format selected for a terminal corresponding to a suppressed zone, an interference amount influencing a neighboring cell, such as IoT, is estimated. In this case, a neighboring base station using a suppressed zone of a service base station as a reserved zone is selected, and an interference amount influencing the selected neighboring base station by data transmitted from a terminal is estimated.

Referring to FIG. 7, in the case of estimating an interference amount of a terminal MS1 to a neighboring cell after allocating a suppressed zone such as an FFR region FF2 to the terminal MS1 in a cell of a base station BS1, an interference amount of the terminal MS1 influencing a neighboring cell is estimated as follows. A base station such as BS3 using the FFR region FF2 as a reserved zone is selected. Here, the FFR region FF2 is allocated to the terminal MS1 as the suppressed zone.

Then, a path gain from the terminal MS1 to the selected base station BS3 is calculated. An IoT value is estimated based on the calculated path gain. The IoT value is estimated using Equation 2 below.

$$IoT(dB) = ToneTxPwr(dBm) + PG(\text{from } BS3, dB) - NoisePwr(dBm) \quad \text{[Equation 2]}$$

In Equation 2, ToneTxPwr denotes transmission power per tone, PG indicates a path gain, and NoisePwr is noise power.

Referring to FIG. 8, an uplink power control apparatus according to an exemplary embodiment of the present invention performs uplink power control according to the exemplary embodiments. The uplink power control apparatus includes a candidate group obtaining unit 10, a path gain calculation unit 20, an interference amount estimation unit 30, a target interference amount setup unit 40, and a transmission power parameter determining unit 50.

The candidate group obtaining unit 10 obtains a candidate group of schedulable encoding packet sizes (Nep) and Transmission Formats (TF) when the OLPC is applied to a terminal allocated with a suppressed zone.

The path gain calculation unit 20 calculates a path gain between a terminal and a neighboring base station. Particularly, the path gain calculation unit 20 calculates a path gain based on preamble related information provided for a terminal by receiving a preamble signal from a neighboring base station.

The interference amount estimation unit 30 estimates the IoT of a neighboring base station based on the calculated path gain and transmission power per tone of each encoding packet size Nep and transmission format TF included in the candidate group.

The target interference amount setup unit 40 finally determines an initial target IoT and an interference amount control value according to a processing load of a serving base station.

The transmission power parameter determining unit 50 selects an IoT value closest to the determined final target IoT among a plurality of IoT values estimated based on the path gain and transmission power of each encoding packet size and transmission format for the finally selected neighboring base station, and obtains an encoding packet size Nep and a transmission format TF corresponding to the selected IoT value. Then, the transmission power parameter determining unit 50 provides the obtained encoding packet size Nep and the transmission format TF to a terminal.

A method for uplink power control according to an exemplary embodiment of the present invention will be described in more detail below with reference to FIG. 9.

Figure 9:
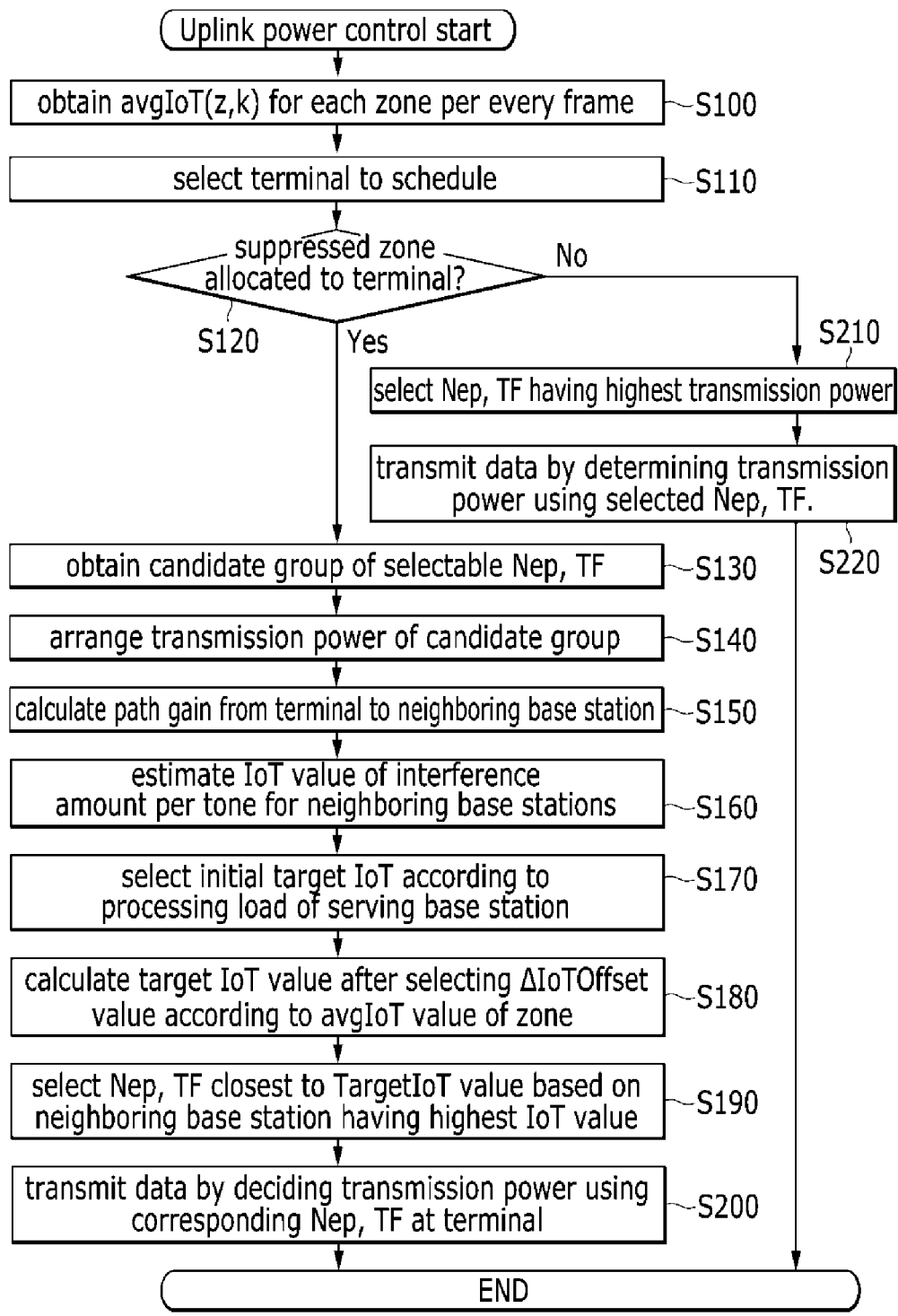
FIG. 9 is a flowchart of a method for uplink power control according to an exemplary embodiment of the present invention.

FIG. 9 is a flowchart of a method for uplink power control according to an exemplary embodiment of the present invention.

Each base station divides an uplink resource to a plurality of FFR regions FFR1-FFR3 as shown in FIG. 7, and a plurality of FFR regions FFR1-FFR3 are divided into a suppressed zone and a reserved zone. A serving base station BS1 performs uplink power control in order to minimize an interference amount to a neighboring cell from a terminal MS1 allocated with a suppressed zone as follows.

At step S100, the serving base station BS1 obtains an average IoT (avgZoneIoT) value of each zone. The serving base station BS1 updates the average IoT value (avgZoneIoT) at every frame. Since such a process is widely known to those skilled in the art, the detailed description thereof is omitted herein.

The serving base station BS1 selects a terminal to be scheduled at a predetermined frame and determines whether the selected terminal is allocated with a suppressed zone or not. More particularly, when the terminal selected at step S110 is allocated with the suppressed zone at the step S120, the candidate group obtaining unit 10 obtains a candidate group including encoding packet sizes Nep and transmission formats NF schedulable when the open-loop power control scheme is applied at step S130. The encoding packet size is different for each transmission format FT in the candidate group, and accordingly, a different transmission power per tone is allocated. Therefore, a transmission power per tone is determined according to the transmission format TF and the encoding packet size Nep. Here, the serving base station BS1 arranges transmission powers per tone mapped to transmission formats TF and encoding packet sizes Nep included in the obtained candidate group in a predetermined order (e.g., descending order) and stores the candidate groups at step S140.

At step s150, the path gain calculation unit of the serving base station BS1 obtains a path gain for the terminal MS1. The terminal MS1 allocated with the suppressed zone receives preamble signals from neighboring base stations and transmits information on the received preamble signals to the serving base station BS1. The serving base station BS1 receives the information related to the preamble signals of the neighboring base stations from the terminal MS1 and calculates the path gain based on the received information. More particularly, the serving base station BS1 selects a neighboring base station (e.g., BS3) that uses the FFR region FFR2, which is allocated to the terminal MS1 as the suppressed zone, as a reserved zone, and calculates a path gain from the terminal MS1 to the neighboring base station BS3 based on information related to a preamble signal transmitted from the selected neighboring base station BS3. In this case, a plurality of neighboring base stations may be selected, and path gains to each selected neighboring base station may be calculated.

At step S160, the interference amount estimation unit 30 of the serving base station BS1 estimates an interference amount to the terminal MS1 (e.g., IoT) based on the transmission power per tone of each encoding packet size and transmission format included in the candidate group. The IoT value, which is an interference amount influencing the selected neighboring base station, is estimated based on Equation 2 in consideration with noise power and a path gain of the selected neighboring base station and the transmission power per tone differently allocated to each encoding packet size and transmission format. As the estimation result, a plurality of IoT values may be estimated for one selected neighboring base station based on transmission powers mapped to a plurality of encoding packet sizes and transmission formats.

At step S170, the target interference amount setup unit 40 of the serving base station BS1 determines an initial target IoT according to a processing load. At step S180, an interference amount control value ($\Delta IoT_{offset}$) based on an average IoT (avgZoneIoT) is obtained per each zone in order to determine a proper target IoT. In this case, a predetermined range may be also assigned to an interference amount control value, and the predetermined range of the interference amount control value may be determined according to the processing load of the serving base station BS1. Therefore, the interference amount control value ($\Delta IoT_{offset}$) may be selected within the predetermined range of the interference amount control value according to the average IoT (avgZoneIoT).

The serving base station BS1 determines a final target IoT by applying the selected interference amount control value ($\Delta IoT_{offset}$) to the initial target IoT. That is, when the processing load of the serving base station BS1 increases, the final target IoT is determined by reducing the initial target IoT by the interference amount control value. When the processing load decreases, the final target IoT is determined by increasing the initial target IoT by the interference amount control value at step S180.

The transmission power parameter determining unit 50 of the serving base station BS1 selects an IoT value closest to the determined final target IoT from a plurality of IoT values that are estimated for the selected neighboring base station based on the path gain and transmission power mapped to encoding packet sizes and transmission formats at step S160. In step S190, the encoding packet size Nep and transmission format TF corresponding to the IoT value selected from the candidate group are obtained. More particularly, when a plurality of neighboring base stations are selected for calculating the path gain at the step S150, the serving base station finally selects a neighboring base station having the highest IoT value among the IoT values obtained at the step S106 from the plurality of selected neighboring base stations. Then, the serving base station selects an IoT value closest to the final target IoT value among a plurality of IoT values estimated based on the path gain and transmission powers mapped to encoding packet sizes and transmission formats, and obtains an encoding packet size Nep and transmission format TF corresponding to the selected IoT value for the finally selected neighboring base station.

The serving base station provides the terminal MS1 with the encoding packet size Nep and transmission format TF selected to reduce the interference amount through the above-described steps. At step S200, the terminal MS1 determines a power for transmitting uplink data based on the provided encoding packet size Nep and transmission format TF, and transmits data according to the determined transmission power.

Therefore, the terminal MS1 can transmit uplink data through an uplink resource of a suppressed zone while minimizing the interference amount and constraining a required service outage probability.

At step S210, the serving base station BS1 selects an encoding packet size Nep and transmission format TF having the highest transmission power among encoding packet sizes Nep and transmission formats schedulable in the open-loop power control scheme when the terminal MS1 is allocated with a reserved zone. At step S220, the serving base station BS1 provides the selected encoding packet size Nep and transmission format TF to the terminal MS1 and the terminal MS1 transmits data with the highest transmission power.

Hereinafter, a method for uplink power control and an apparatus thereof in consideration of the second case according to an exemplary embodiment of the present invention will be described.

Like the first exemplary embodiment of the present invention, an uplink power control apparatus according to this exemplary embodiment of the present invention includes a candidate group obtaining unit 10, a path gain calculation unit 20, an interference amount estimation unit 30, a target interference setup unit 40, and a transmission power parameter determining unit 50. Unlike the first exemplary embodiment, the path gain calculation unit 20 calculates a path gain using a minimum preamble transmission power within a predetermined preamble transmission power range for a neighboring base station. Hereinafter, this exemplary embodiment will be described in detail.

A method for uplink power control according to an exemplary embodiment of the present invention will be described based on an assumption of the wireless communication environment shown in FIG. 7. In an exemplary embodiment of the present invention, it is assumed that the preamble transmission power of a neighboring cell is changed as the second case.

Accurate preamble transmission power may be unknown when the preamble transmission power of a neighboring cell is changed. However, it may be assumed that the preamble transmission power is changed within a predetermined range. In this case, it is required to presume the worst case for estimating an interference amount influencing a neighboring base station from a corresponding terminal. That is, when a preamble transmission power range of a base station is assumed by a Self Organizing Network (SON) function as follows, a preamble transmission power is determined based on the minimum value.

$$TxPwr\_min < TxPwr(dBm) < TxPwr\_max \quad \text{[Equation 3]}$$

Herein, TxPwr denotes transmission power of a preamble, TxPwr_min denotes a minimum preamble transmission power, and TxPwr_max denotes a maximum preamble transmission power.

When a terminal estimates a path gain to a neighboring base station based on the preamble transmission power range, it is determined that a neighboring base station transmits a preamble with a minimum preamble transmission power (TxPwr_min) corresponding to the worst case, and a path gain is estimated based on a preamble signal having the minimum preamble transmission power.

Figure 10:
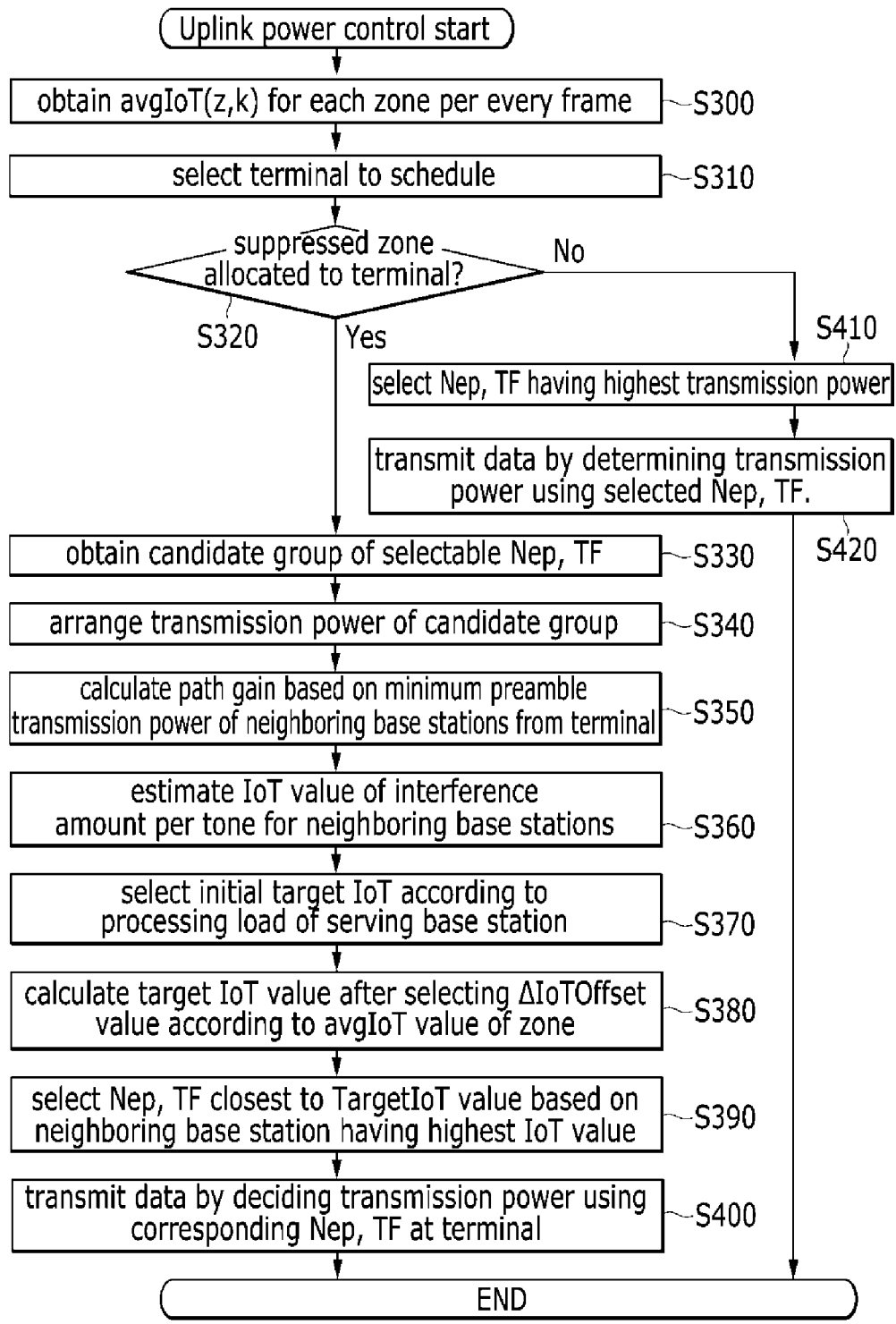
FIG. 10 is a flowchart of a method for controlling uplink power according to an exemplary embodiment of the present invention.

FIG. 10 is a flowchart of a method for controlling uplink power according to an exemplary embodiment of the present invention.

Referring to FIG. 10, in the uplink power control according to an exemplary embodiment of the present invention, a serving base station BS1 obtains a candidate group of encoding packet sizes Nep and transmission formats TF for a terminal MS1 allocated with a suppressed zone at steps S300 to S340, substantially identical to the exemplary embodiment of the present invention described above with regard to FIG. 9.

Then, a path gain is calculated for the selected neighboring base stations. Unlike the first exemplary embodiment, the path gain is calculated based on a minimum preamble transmission power TxPwr_min of a neighboring base station at step S350. In this case, the path gain may be calculated after obtaining information on a preamble transmission power range of each neighboring base station.

At step S360, the serving base station BS1 estimates an IoT value based on the calculated path gain and a transmission power per tone of each encoding packet size Nep and transmission format TF included in the candidate group. At steps S370 and S380, a final IoT value is determined based on an interference amount control value and an initial target IoT according to a processing load of the serving base station BS1, identically to the first exemplary embodiment. Identically to the first exemplary embodiment, an IoT value closest to the final target IoT is selected from a plurality of IoT values estimated based on the path gain and the transmission power of each encoding packet size and transmission format for the finally selected neighboring base station, and the terminal MS1 is controlled by obtaining an encoding packet size Nep and transmission format TF corresponding to the selected IoT at steps S390 and S400. When the terminal MS1 is allocated with a reserved zone, the transmission power is controlled at steps S410 and S420, identical to the first exemplary embodiment.

The operations of each constituent element of the uplink power control apparatus according to this exemplary embodiment of the present invention may be easily implemented by a person skilled in the art. Accordingly, the detailed descriptions thereof are omitted herein.

According to an exemplary embodiment of the present invention, power can be effectively controlled without exchanging information between base stations by measuring an interference amount by a terminal of a neighboring cell when a base station is moving in a wireless communication system or when a base station is unable to communicate with neighboring base stations. Further, an interference amount between adjacent cells can be reduced by allocating radio resources to terminals based on CINR measured by a terminal.

The above-described embodiments of the present invention may be implemented not only through a method or a device, but also as a computer-readable storage medium encoded with a program that performs functions corresponding to the constituent elements of the above-described embodiments of the present invention. A person ordinarily skilled in the art may easily realize such implementation based on the above descriptions of the exemplary embodiments.

While the invention has been shown and described with reference to certain exemplary embodiments thereof, it will be understood by those skilled in the art various changes in form and details may be made therein without departing from the spirit and scope of the invention as defined by the appended claims and their equivalents.

What is claimed is:

1. A method for controlling an uplink power of a terminal at a base station, the method comprising:
    at the base station, obtaining a candidate group including schedulable encoding packet sizes and transmission formats each comprising a different transmission power per tone;
    at the base station, calculating a path gain between the terminal and a neighboring base station;
    estimating at least one interference amount for the neighboring base station based on the calculated path gain and the transmission power per tone of each encoding packet size and transmission format included in the candidate group;
    at the base station, determining a target interference amount based on an interference control amount value;
    selecting one from the at least one estimated interference amount based on the target interference amount; and
    controlling a transmission power of the terminal based on the encoding packet size and transmission format corresponding to the selected estimated interference amount.

2. The method of claim 1, wherein, after the calculating of the path gain, the terminal is allocated with an uplink resource of a suppressed zone and a base station using the uplink resource is selected as the neighboring base station, and a path gain for the selected neighboring base station is calculated.

3. The method of claim 1, wherein the determining of the target interference amount includes:
    selecting the interference amount control value based on an average interference amount of each zone where an uplink resource is divided into a plurality of zones; and
    determining the target interference amount by applying the selected interference amount control value to an initial target interference amount.

4. The method of claim 3, wherein the initial target interference amount is determined according to a processing load of the base station.

5. The method of claim 4, wherein the processing load of the base station comprises a number of terminals that the base station provides service to.

6. The method of claim 3, wherein in the determining of the target interference amount,
    the target interference amount is determined by reducing an initial target interference amount by the interference amount control value when the processing load of the base station increases, and the target interference amount is determined by increasing the initial target interference amount by the interference amount control value when the processing load decreases.

7. The method of claim 1, wherein in the selecting of one from the at least one estimated interference amount,
    an interference amount is selected by one closest to the determined target interference amount among interference amounts estimated for the neighboring base station based on the path gain and the transmission power of each encoding packet size and transmission format.

8. The method of claim 7, wherein in the selecting of one from the at least one estimated interference amount,
    in case of a plurality of neighboring base stations, a neighboring base station having a largest interference amount is selected from a plurality of interference amounts estimated for the plurality of neighboring base stations, and one interference amount is selected from the interference amounts estimated for the selected neighboring base station.

9. The method of claim 1, wherein in the estimating of the at least one interference amount,
    an interference amount is estimated based on $$IoT(\text{dB}) = \text{ToneTxPwr}(\text{dBm}) + \text{PG}(\text{from BS3, dB}) - \text{NoisePwr}(\text{dBm}),$$

wherein ToneTxPwr denotes a transmission power per tone corresponding to an encoding packet size and a transmission format in the candidate group, PG denotes a calculated path gain, and NoisePwr denotes a noise power.

10. The method of claim 1, wherein in the calculating of the path gain,
    the path gain is calculated between the neighboring base station and a terminal based on information of a preamble provided from the terminal, the terminal receiving a preamble signal from the neighboring base station.

11. The method of claim 10, wherein the preamble signal of a base station comprises a fixed power value.

12. The method of claim 1, wherein in the calculating of the path gain,
    a predetermined range of a minimum preamble power and a maximum preamble power is assigned for preamble power of a neighboring base station, and a path gain between the terminal and the neighboring base station is calculated based on a minimum preamble power of the predetermined range.

13. The method of claim 12, wherein the preamble signal of the neighboring base station comprises a variable power value.

14. An apparatus for controlling an uplink power of a terminal at a base station, the apparatus comprising:
    a candidate group obtaining unit for obtaining a candidate group comprising schedulable encoding packet sizes and transmission formats each comprising a different transmission power per tone;
    a path gain calculation unit for calculating a path gain between the terminal and a neighboring base station;
    an interference amount estimation unit for estimating at least one interference amount for the neighboring base station based on the calculated path gain and the transmission power per tone of each encoding packet size and transmission format included in the candidate group;
    a target interference amount setup unit for setting up a target interference amount based on an initial target interference amount according to a processing load of the base station and an interference amount control value; and
    a transmission power parameter determining unit for selecting one based on the target interference amount from the estimated interference amounts, obtaining an encoding packet size and a transmission format corresponding to the selected interference amount, and providing the obtained encoding packet size and transmission format to the terminal.

15. The apparatus of claim 14, wherein a preamble signal of the neighboring base station comprises a fixed power value, and
    a path gain between the terminal and a neighboring base station is calculated based on information related to a preamble transmitted from the terminal by receiving the preamble signal from the neighboring base station.

16. The apparatus of claim 14, wherein a preamble signal of the neighboring base station comprises a variable power value, and
    the path gain calculation unit calculates a path gain between the terminal and the neighboring base station using a predetermined range of a minimum preamble power and a maximum preamble power for the preamble power of the neighboring base station.

17. The apparatus of claim 14, wherein the target interference amount setup unit selects an interference amount control value based on an average interference amount obtained per each zone for an uplink resource divided among a plurality of zones, and determines a final target interference amount by applying the selected interference amount control value to a predetermined initial target interference amount according to the processing load of the base station.

18. The apparatus of claim 17, wherein the target interference amount setup unit determines a target interference amount by reducing an initial target interference amount by the interference amount control value when the processing load of the base station increases, and determines the target interference amount by increasing the initial target interference amount by the interference amount control value when the processing load decreases.

19. The apparatus of claim 14, wherein the transmission power parameter determining unit selects a neighboring base station having a largest interference amount from estimated interference amounts, and selects an interference amount having a value closest to the target interference amount among interference amounts estimated for the selected neighboring base station.

* * * * *